(12) United States Patent
Olivieri et al.

(10) Patent No.: US 7,870,110 B2
(45) Date of Patent: Jan. 11, 2011

(54) METHOD AND SYSTEM FOR GENERATING A TRANSACTION-BOUND SEQUENCE OF RECORDS IN A RELATIONAL DATABASE TABLE

(75) Inventors: Ricardo N. Olivieri, Austin, TX (US); Mark B. Whelan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 12/038,074

(22) Filed: Feb. 27, 2008

(65) Prior Publication Data

US 2009/0216813 A1 Aug. 27, 2009

(51) Int. Cl.
G06F 7/00 (2006.01)
G06F 17/00 (2006.01)

(52) U.S. Cl. .................... 707/703; 707/791; 707/802; 707/999.103

(58) Field of Classification Search ............... 707/703, 707/709, 802, 999.102, 999.103, 999.104, 707/791
See application file for complete search history.

(56) References Cited

U.S. PATENT DOCUMENTS

| | | | | |
|---|---|---|---|---|
| 5,799,305 A * | 8/1998 | Bortvedt et al. | ........ | 707/999.01 |
| 5,930,806 A | 7/1999 | Taira et al. | | |
| 5,995,980 A | 11/1999 | Olson et al. | | |
| 7,167,858 B2 * | 1/2007 | Naeymi-Rad et al. | . | 707/999.006 |
| 2001/0044834 A1 * | 11/2001 | Bradshaw et al. | ........... | 709/217 |
| 2003/0200212 A1 * | 10/2003 | Benson et al. | .................. | 707/7 |
| 2003/0204420 A1 * | 10/2003 | Wilkes et al. | .................. | 705/3 |
| 2004/0193655 A1 * | 9/2004 | Miyata et al. | ............... | 707/200 |
| 2004/0267809 A1 | 12/2004 | East et al. | | |
| 2005/0027725 A1 | 2/2005 | Kagalwala et al. | | |
| 2005/0038671 A1 * | 2/2005 | Naeymi-Rad et al. | .......... | 705/2 |
| 2005/0071341 A1 * | 3/2005 | Chkodrov et al. | ........... | 707/100 |
| 2005/0131966 A1 * | 6/2005 | Lou | ........................... | 707/204 |
| 2007/0115738 A1 * | 5/2007 | Emaru et al. | ................. | 365/203 |
| 2007/0203910 A1 * | 8/2007 | Ferguson et al. | ............... | 707/8 |
| 2008/0098045 A1 * | 4/2008 | Radhakrishnan et al. | .... | 707/203 |
| 2009/0024871 A1 * | 1/2009 | Emaru et al. | .................... | 714/6 |

* cited by examiner

*Primary Examiner*—John E Breene
*Assistant Examiner*—Phong Nguyen
(74) *Attorney, Agent, or Firm*—Dillon & Yudell LLP

(57) ABSTRACT

A method for generating a transaction-bound sequence of records in a database table is disclosed. In response to a transaction attempting to insert a record to a database table within a relational database, an identification (ID) of the transaction and the name of the associated database table are initially obtained. A determination is then made whether or not the obtained transaction ID and the associated database table name are found in the transaction-bound tracking table. If they are not found in the transaction-bound tracking table, a new entry is generated in the transaction-bound tracking table for the obtained transaction ID and database table name, and a value in a last_order_number column associated with the entry is set to 1; otherwise, a value in the last_order_number column associated with the entry is incremented by 1. The value in the last_order_number column associated with the entry is subsequently copied to the corresponding order tracking field associated with the record entry in the database table.

9 Claims, 3 Drawing Sheets

METHOD AND SYSTEM FOR GENERATING A TRANSACTION-BOUND SEQUENCE OF RECORDS IN A RELATIONAL DATABASE TABLE

BACKGROUND OF THE INVENTION

1. Technical Field

The present invention relates to databases in general, and in particular to relational databases. Still more particularly, the present invention relates to a method and apparatus for generating a transaction-bound sequence of records in a database table within a relational database.

2. Description of Related Art

Database tables are commonly utilized by database programmers during database development. A database programmer can add a numerical field, such as an ORDER field, to a database table for tracking the order in which records are entered into the database table. For example, an ORDER field can be added to an EMPLOYEE database table having a NAME field, an EMPLOYEE_NUMBER field, and a STATE field for keeping track of the order of records being inserted in the EMPLOYEE database table. Records added into the EMPLOYEE database table are typically managed by a global mechanism of a relational database. Each time a new record is added to the EMPLOYEE database table, a number is generated in the ORDER field by the global mechanism of the relational database. The value of the number in a corresponding entry of the ORDER field is automatically incremented by 1 for each new record entered, thus allowing all records in the EMPLOYEE database table to be tracked, as shown in Table I.

TABLE I

| NAME | EMPLOYEE_NUMBER | STATE | ORDER |
| --- | --- | --- | --- |
| name_1 | 00001 | TX | 1 |
| name_2 | 00002 | TX | 2 |
| name_3 | 00003 | TX | 3 |
| name_4 | 00004 | CA | 4 |
| name_5 | 00005 | CA | 5 |
| name_6 | 00006 | NY | 6 |
| name_7 | 00007 | NY | 7 |
| name_8 | 00008 | FL | 8 |
| name_9 | 00009 | FL | 9 |

Quite often, multiple records within a database table may be related or belong to a common transaction. However, global mechanisms of existing relational databases do not support numbering of the records within a database table in a transaction-bound order such that records are numbered based upon common transactions.

Consequently, it would be desirable to provide a method and system for generating a transaction-bound sequence of records in a database table within a relational database.

SUMMARY OF THE INVENTION

In accordance with a preferred embodiment of the present invention, a transaction-bound tracking table, which includes a transaction_id column, a table_name column and a last_order_number column, is provided to a relational database. In response to an transaction attempting to insert a record to a database table within the relational database, an identification (ID) of the transaction and the name of the associated database table are initially obtained. A determination is then made whether or not the obtained transaction ID and the associated database table name are found within the corresponding columns of the transaction-bound tracking table. If the obtained transaction ID and the database table name are not found in the transaction-bound tracking table, a new entry is generated in the transaction-bound tracking table for the obtained transaction ID and database table name, and a value in the last_order_number column associated with the entry is set to 1. Otherwise, if the obtained transaction ID and the database table name are found in the transaction-bound tracking table, a value in the last_order_number column associated with the entry is incremented by 1. The value in the last_order_number column associated with the entry is subsequently copied to the corresponding order tracking field associated with the record entry in the database table for the transaction.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
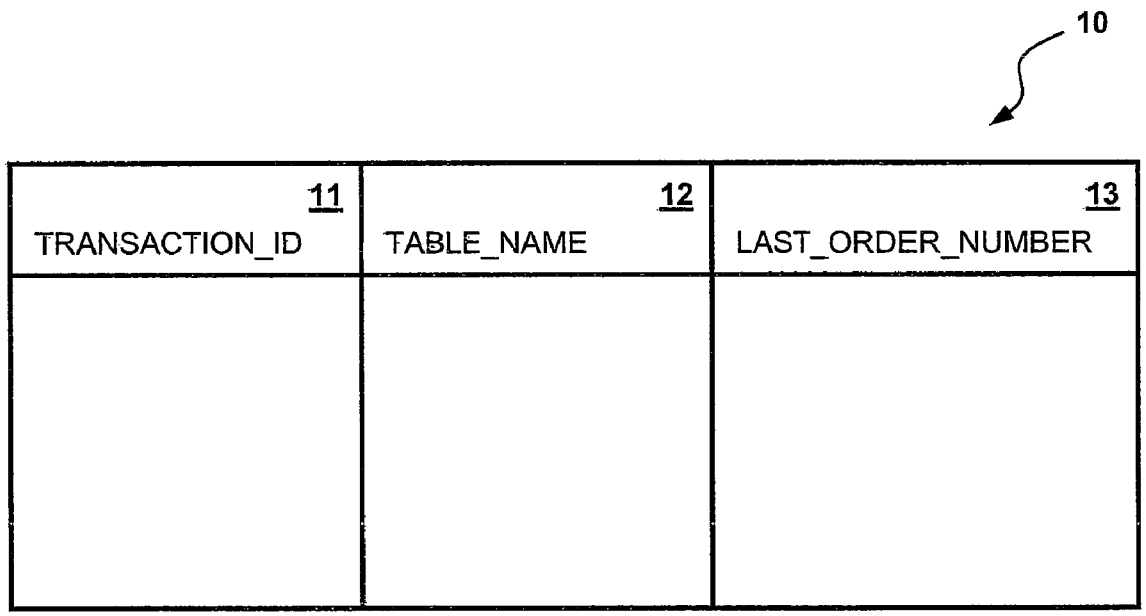
FIG. 1 is a block diagram of a transaction-bound tracking table, in accordance with a preferred embodiment of the present invention.

In order for a relational database to have the capability to track transaction-bound sequences for database tables, a transaction-bound tracking table is initially provided within the relational database. With reference now to the drawings, and in particular to FIG. 1, there is illustrated a block diagram of a transaction-bound tracking table, in accordance with a preferred embodiment of the present invention. As shown, a transaction-bound tracking table 10 includes a TRANSACTION_ID column 11, a TABLE_NAME column 12, and a LAST_ORDER_NUMBER column 13. As their names imply, TRANSACTION_ID column 11 contains unique transaction identifications (IDs) of transactions, TABLE_NAME column 12 contains database table names, and LAST_ORDER_NUMBER column 13 contains last order numbers.

Figure 2:
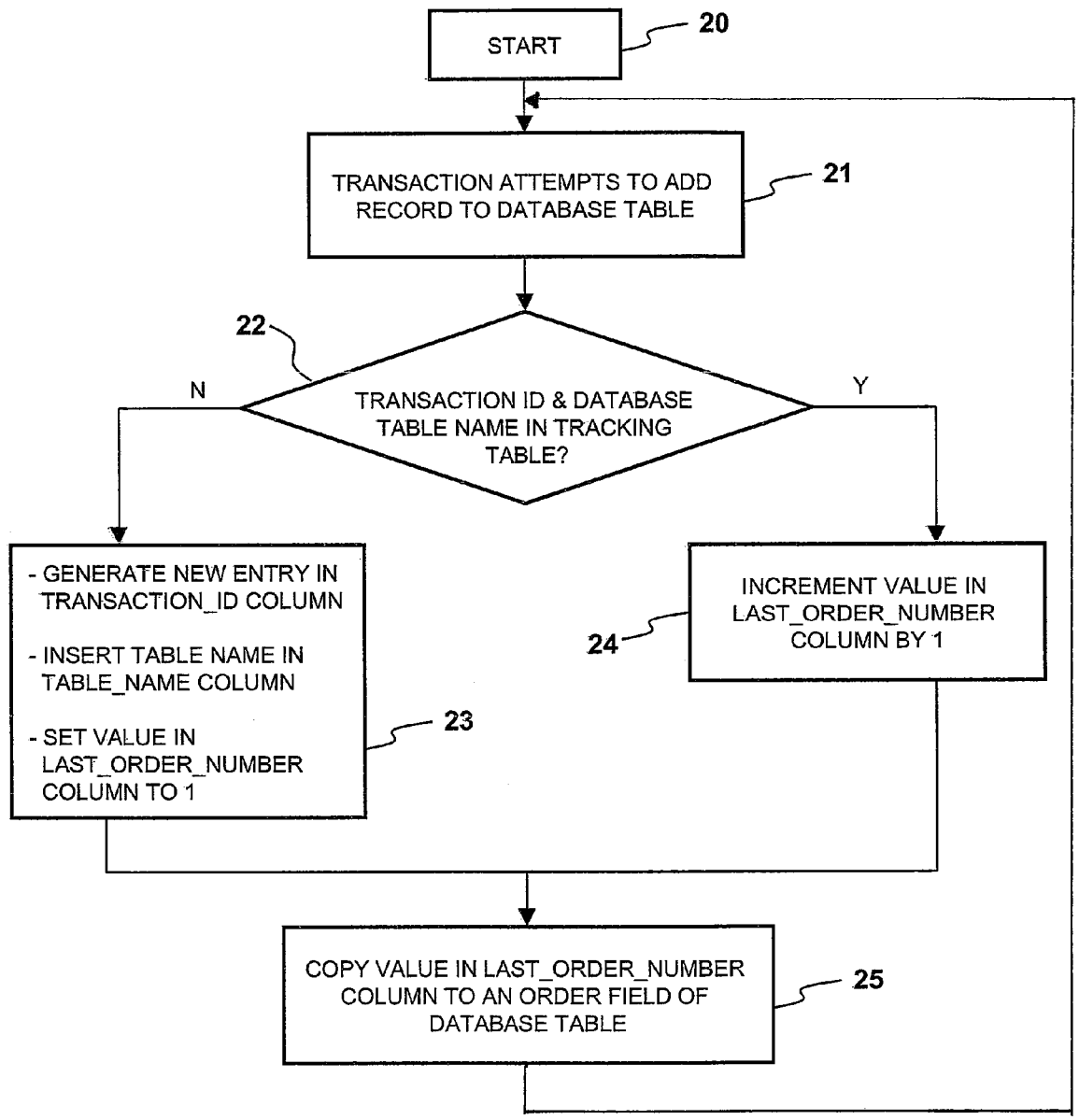
FIG. 2 is a high-level logic flow diagram of a method for generating a transaction-bound sequence of records in a database table within a relational database, in accordance with a preferred embodiment of the present invention.

With reference now to FIG. 2, there is depicted a high-level logic flow diagram of a method for generating a transaction-bound sequence of records in a database table within a relational database, in accordance with a preferred embodiment of the present invention. In addition to various fields, the database table also includes a transaction-bound order field. A transaction-bound order field can be added to any application database table by a database programmer via a callable database procedure (or an extension to the SQL language). Starting at block 20, in response to a transaction attempting to add a record to the database table, as shown in block 21, a determination is made whether or not the identification (ID) of the transaction and the name of the database table are already in the TRANSACTION_ID column and the TABLE_NAME column, respectively, of a transaction-bound tracking table, such as transaction-bound tracking table 10 from FIG. 1, as depicted in block 22.

The relational database can obtain the transaction ID by utilizing a database Application Program Interface (API). For example, a callable database procedure that knows how to obtain the transaction ID can be invoked. The callable database procedure then uses the database API to obtain the transaction ID and returns the transaction ID to the caller. If the relational database does not have an API for obtaining the current transaction ID, then the relational database can query the database transaction logs to determine the transaction ID.

If the transaction ID and database table name are not found in the TRANSACTION_ID and TABLE_NAME columns, respectively, of the transaction-bound tracking table, a new entry is generated in the TRANSACTION_ID column for the transaction ID, the database table name is inserted into the TABLE_NAME column of the same entry, and a value in the LAST_ORDER_NUMBER column of the same entry is set to 1, as shown in block 23.

Otherwise, if the transaction ID and database table name are found in the TRANSACTION_ID and TABLE_NAME columns, respectively, of the transaction-bound tracking table, the value in the LAST_ORDER_NUMBER column of the associated entry is incremented by 1, as depicted in block 24.

Finally, the value in the LAST_ORDER_NUMBER column of the entry associated with the transaction is copied to an ORDER field of the database table for the record associated the transaction, as shown in block 25, and the process returns to block 21.

For all records of the database table that are processed as discussed above, the order of insertion of the records will be numbered according to a transaction-bound sequential order. For example, in the above-mentioned Table I, if the first four records belong to a first transaction, the fifth and sixth records belong to a second transaction, and the last three records belong to a third transaction, the values in the ORDER field of the database table are entered by the method of the present invention as shown in Table II:

TABLE II

| NAME | EMPLOYEE_NUMBER | STATE | ORDER |
| --- | --- | --- | --- |
| name_1 | 00001 | TX | 1 |
| name_2 | 00002 | TX | 2 |
| name_3 | 00003 | TX | 3 |
| name_4 | 00004 | CA | 4 |
| name_5 | 00005 | CA | 1 |
| name_6 | 00006 | NY | 2 |
| name_7 | 00007 | NY | 1 |
| name_8 | 00008 | FL | 2 |
| name_9 | 00009 | FL | 3 |

For all those transactions that have "completed," corresponding entries can be removed from the transaction-bound tracking table. The transaction removal can be performed by, for example, a pre-scheduled daemon or background process that uses API of the relational database or the transaction log records to determine whether or not certain transactions in the transaction-bound tracking table have been completed. This process basically queries the transaction-bound tracking table to get all transaction IDs and then determines which of those transactions have completed such that entries of the completed transactions can be removed from the transaction-bound tracking table.

As has been described, the present invention provides a method for generating transaction-bound sequences for numbering records in a database table of a relational database. The present invention allows transaction-insensitive global mechanisms to be extended for numbering records in database tables to the generation of sequences that number the records within particular transactions.

Figure 3:
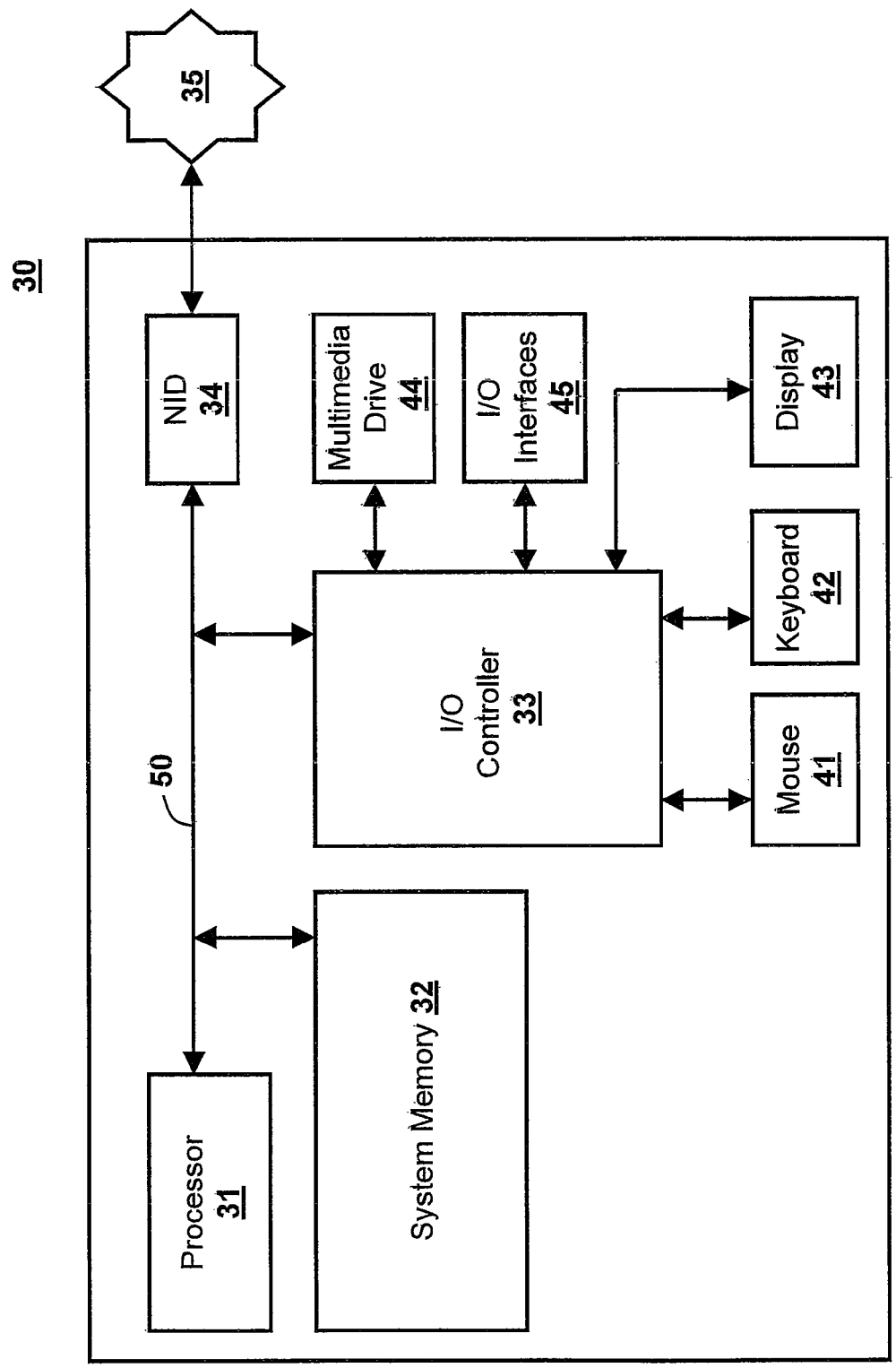
FIG. 3 is a block diagram of a data processing system in which a preferred embodiment of the present invention is incorporated.

Referring now to FIG. 3, there is illustrated a block diagram of a data processing system in which a preferred embodiment of the present invention is incorporated. As shown, a data processing system 30 includes a processor 31, a system memory 32, an input/output (I/O) controller 33, and a network interface device (NID) 34, all connected to a system bus 50. I/O controller 33 supports peripheral I/O and storage devices, of which a mouse 41, a keyboard 42, a display 43, and a multimedia drive 44 are shown, and provides I/O connectivity to data processing system 30 via I/O interfaces 45 (serial, parallel, or USB interfaces). Correspondingly, NID 34 (e.g., modem) interconnects data processing system 30 with access networks 35 such as the Internet. System memory 32 may include cache memory, random access memory (RAM), read-only memory (ROM), firmware memory devices, among other computer storage medium elements.

While an illustrative embodiment of the present invention has been described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for generating a transaction-bound sequence of records in a database table of a relational database, said method comprising:
    in response to an transaction attempting to add a record to a database table within a relational database, obtaining an identification (ID) of said transaction and a name of said database table;
    determining whether or not an entry having said obtained transaction ID and database table name is contained within a transaction-bound tracking table;
    in a determination that an entry having said obtained transaction ID and database table name are not contained within said transaction-bound tracking table, generating a new entry in said transaction-bound tracking table for said obtained transaction ID and database table name, and setting a value in a last_order_number column of said new entry to 1;
    in a determination that an entry having said obtained transaction ID and database table name are contained within said transaction-bound tracking table, incrementing a value in said last_order_number column of said entry by 1;
    copying said value in said last_order_number column of said entry to an order field in said record of said database table for said transaction;

utilizing a pre-scheduled daemon that uses an Application Program Interface of said relational database to identify said completed transactions; and removing entries associated with completed transactions from said transaction-bound tracking table.

2. The method of claim 1, wherein said method further includes utilizing a transaction log record to identify said completed transactions.

3. The method of claim 1, wherein said transaction-bound tracking table also includes a transaction_id column and a table_name column.

4. A computer storage medium having a computer program product for generating a transaction-bound sequence of records in a database table of a relational database, said computer storage medium comprising:

computer program code for, in response to an transaction attempting to add a record to a database table within a relational database, obtaining an identification (ID) of said transaction and a name of said database table;

computer program code for determining whether or not an entry having said obtained transaction ID and database table name is contained within a transaction-bound tracking table;

computer program code for, in a determination that an entry having said obtained transaction ID and database table name are not contained within said transaction-bound tracking table, generating a new entry in said transaction-bound tracking table for said obtained transaction ID and database table name, and setting a value in a last_order_number column of said new entry to 1;

computer program code for, in a determination that an entry having said obtained transaction ID and database table name are contained within said transaction-bound tracking table, incrementing a value in said last_order_number column of said entry by 1;

computer program code for copying said value in said last_order_number column of said entry to an order field in said record of said database table for said transaction;

computer program code for utilizing a pre-scheduled daemon that uses an Application Program Interface of said relational database to identify said completed transactions; and computer program code for removing entries associated with completed transactions from said transaction-bound tracking table.

5. The computer storage medium of claim 4, wherein said computer storage medium further includes computer program code for utilizing a transaction log record to identify said completed transactions.

6. The computer storage medium of claim 4, wherein said transaction-bound tracking table also includes a transaction_id column and a table_name column.

7. A database system capable of generating a transaction-bound sequence of records in a database table within a relational database, said database system comprising:

means for, in response to an transaction attempting to add a record to a database table within a relational database, obtaining an identification (ID) of said transaction and a name of said database table;

means for determining whether or not an entry having said obtained transaction ID and database table name is contained within a transaction-bound tracking table;

means for, in a determination that an entry having said obtained transaction ID and database table name are not contained within said transaction-bound tracking table, generating a new entry in said transaction-bound tracking table for said obtained transaction ID and database table name, and setting a value in a last_order_number column of said new entry to 1;

means for, in a determination that an entry having said obtained transaction ID and database table name are contained within said transaction-bound tracking table, incrementing a value in said last_order_number column of said entry by 1;

means for copying said value in said last_order_number column of said entry to an order field in said record of said database table for said transaction;

means for utilizing a pre-scheduled daemon that uses an Application Program Interface of said relational database to identify said completed transactions; and means for removing entries associated with completed transactions from said transaction-bound tracking table.

8. The database system of claim 7, wherein said database system further includes a transaction log record for identifying said completed transactions.

9. The database system of claim 7, wherein said transaction-bound tracking table also includes a transaction_id column and a table_name column.

* * * * *